US012608229B2

(12) United States Patent
Kato et al.

(10) Patent No.: US 12,608,229 B2
(45) Date of Patent: Apr. 21, 2026

(54) CONTROL SYSTEM WITH FIRST ELECTRONIC DEVICE AND SECOND ELECTRONIC DEVICE COORDINATING PLURALITY OF EXECUTION REQUESTS AND REQUEST PROCESSING METHOD IN CONTROL SYSTEM

(71) Applicant: HONDA MOTOR CO., LTD., Tokyo (JP)

(72) Inventors: Hisahiro Kato, Tokyo (JP); Hiroaki Hakukawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 632 days.

(21) Appl. No.: 18/153,460

(22) Filed: Jan. 12, 2023

(65) Prior Publication Data

US 2023/0251901 A1     Aug. 10, 2023

(30) Foreign Application Priority Data

Feb. 8, 2022    (JP) ................................. 2022-017767
Aug. 30, 2022    (JP) ................................. 2022-137214

(51) Int. Cl.
*G06F 9/48*          (2006.01)

(52) U.S. Cl.
CPC .................................. *G06F 9/4887* (2013.01)

(58) Field of Classification Search
None
See application file for complete search history.

(56) References Cited

U.S. PATENT DOCUMENTS

2006/0047873 A1* 3/2006 Bose ..................... G06F 13/362
                                                                710/243
2008/0183913 A1* 7/2008 Ryu ........................ G06F 13/28
                                                                710/25
2010/0248771 A1* 9/2010 Brewer ................. H04W 72/56
                                                                455/518
2011/0317193 A1   12/2011 Iwase et al.
2018/0375784 A1* 12/2018 Balakrishnan ...... H04L 47/6275
2019/0222645 A1    7/2019 Hellwig et al.
2020/0358784 A1* 11/2020 Khaund ............. G06F 16/2379
2023/0082383 A1    3/2023 Kono

FOREIGN PATENT DOCUMENTS

JP          H02004025 A       1/1990
JP          2010-028505 A     2/2010
JP          2010-142375 A     7/2010
JP          2012-008401 A     1/2012
                    (Continued)

OTHER PUBLICATIONS

Japanese Office Action Corresponding to Application No. JP 2022137214.A, dated Feb. 27, 2024, 11 pages.

*Primary Examiner* — Eric C Wai
(74) *Attorney, Agent, or Firm* — Rankin, Hill & Clark LLP

(57)          ABSTRACT

A control system includes a first electronic device that processes execution requests from a plurality of devices in an order according to a first priority rank that is assigned to each execution request, and a second electronic device that receives execution requests from some of the plurality of devices and transmits the execution requests to the first electronic device in an order according to a second priority rank that is assigned to each execution request.

8 Claims, 8 Drawing Sheets

(56)        References Cited

FOREIGN PATENT DOCUMENTS

| | | | |
|---|---|---|---|
| JP | 2015-125764 | A | 7/2015 |
| JP | 2019-126034 | A | 7/2019 |
| JP | 2020-032892 | A | 3/2020 |
| JP | 2021-128531 | A | 9/2021 |
| WO | 2018/096755 | A1 | 5/2018 |

* cited by examiner

FIG.3

| FIRST PRIORITY RANK | EXECUTION REQUEST |
|---|---|
| High | |
| 1 | REQ1001 |
| 2 | REQ1002 |
| Middle | |
| 3 | REQ1003 |
| 4 | REQ1004 |
| 5 | REQ1005 |
| ⋮ | ⋮ |
| Low | |

FIG.4

| SECOND PRIORITY RANK | EXECUTION REQUEST | FIRST PRIORITY RANK |
|---|---|---|
| 1 | REQ1001 | |
| 2 | REQ1002 | |
| 3 | REQ1003 | |

FIG.5

| SECOND PRIORITY RANK | EXECUTION REQUEST | FIRST PRIORITY RANK |
|---|---|---|
| 1 | REQ2001 | High |
| 2 | REQ1001 | |
| 3 | REQ2002 | Middle |
| 4 | REQ1002 | |
| 5 | REQ1003 | |
| 6 | REQ2003 | Low |

| FIRST PRIORITY RANK | EXECUTION REQUEST | |
|---|---|---|
| 1 | | REGULATIONS & DIAGNOSIS GROUP |
| 2 | REQ1001 | |
| 3 | REQ1002 | |
| 4 | | |
| 5 | | |
| 6 | REQ1003 | |
| 7 | REQ1004 | |
| 8 | | USER OPERATION GROUP |
| 9 | REQ1005 | |
| 10 | | |
| 11 | | AUTOMATED DRIVING GROUP |
| 12 | REQ1006 | |
| 13 | REQ1007 | |
| 14 | REQ1008 | STOPPING FUNCTION GROUP |
| 15 | | |
| 16 | REQ1009 | |

FIG.7

| SECOND PRIORITY RANK | EXECUTION REQUEST | FIRST PRIORITY RANK |
|:---:|:---:|:---:|
| 1 | REQ2001 | 1 |
| 2 | REQ1001 | |
| 3 | REQ2002 | 8 |
| 4 | REQ1002 | |
| 5 | REQ1003 | |
| 6 | REQ2003 | 15 |

CONTROL SYSTEM WITH FIRST ELECTRONIC DEVICE AND SECOND ELECTRONIC DEVICE COORDINATING PLURALITY OF EXECUTION REQUESTS AND REQUEST PROCESSING METHOD IN CONTROL SYSTEM

INCORPORATION BY REFERENCE

The present application claims priority under 35 U.S.C. § 119 to Japanese Patent Application No. 2022-017767 filed on Feb. 8, 2022 and Japanese Patent Application No. 2022-137214 filed on Aug. 30, 2022. The content of the applications is incorporated herein by reference in its entirety.

BACKGROUND OF THE INVENTION

Field of the Invention

The present invention relates to a control system that processes execution requests from a plurality of devices and a request processing method in the control system.

Description of the Related Art

International Publication No. WO 2018/096755 discloses a parallel processing device that connects a plurality of electronic control devices to one another through buses. Upon accepting a plurality of processing requests for the electronic control devices relating to independent applications, this parallel processing device coordinates these processing requests according to their respective degrees of priority and executes a plurality of processes corresponding to the processing requests.

Japanese Patent Laid-Open No. 2020-32892 discloses a control device that controls a brake of a vehicle. This control device coordinates a plurality of motion requests for actuators received from a plurality of application request units according to a predetermined criterion, and controls each of the actuators based on the result of coordination.

SUMMARY OF THE INVENTION

However, when the types or the frequency of occurrence of processing execution requests from on-board devices or applications increases as, for example, functions in vehicles become more diverse and complicated, coordinating all processing requests in one processing device or control device may become difficult in terms of the processing load or the processing speed.

An object of the present invention is to realize a control system that can quickly coordinate a plurality of received execution requests.

One aspect of the present invention is a control system including a first electronic device that processes execution requests from a plurality of devices and a second electronic device that receives execution requests from some of the plurality of devices and transmits the execution requests to the first electronic device. The first electronic device includes a first coordination unit that determines an order of processing of execution requests from the plurality of devices according to a first priority rank that is assigned to each execution request. The second electronic device includes a second coordination unit that determines an order of transmission for transmitting execution requests from some of the plurality of devices to the first electronic device according to a second priority rank that is assigned to each execution request, and a transmission unit that transmits the execution requests to the first electronic device in the order of transmission determined by the second coordination unit.

According to another aspect of the present invention, in the first electronic device, the first priority ranks are set such that available ranks to which execution requests are not assigned are included, dispersedly in order of rank, among ranks to which execution requests are assigned.

According to another aspect of the present invention, the execution requests include a first execution request to which the first priority rank is assigned in the first electronic device and a second execution request to which the first priority rank is not assigned in the first electronic device. When the second execution request is received, the second coordination unit of the second electronic device assigns one of the available ranks to the second execution request as the first priority rank. The transmission unit of the second electronic device transmits to the first electronic device, along with the second execution request, priority rank information that shows the first priority rank assigned to the second execution request by the second coordination unit.

According to another aspect of the present invention, the first electronic device stores a first coordination table that shows a correspondence relationship between each of the first execution requests and the first priority rank. The first coordination unit of the first electronic device determines an order of processing of the received execution requests including the first execution request and the second execution request based on the first coordination table and the priority rank information on the second execution request received from the second electronic device.

According to another aspect of the present invention, the second electronic device stores a second coordination table that shows a correspondence relationship between each of the execution requests and the second priority rank and the available ranks to be assigned to the second execution requests. Based on the second coordination table, the second coordination unit of the second electronic device assigns the first priority rank that is the available rank to the second execution request and determines the order of transmission of the execution requests to the first electronic device.

According to another aspect of the present invention, the first electronic device includes an execution unit that processes the execution requests in an order determined by the first coordination unit. When the execution request is received from the second electronic device, the execution unit transmits execution information that is information about a status of execution of the received execution request to the second electronic device.

According to another aspect of the present invention, the execution request includes request processing information that shows a content of processing to be performed by the first electronic device.

Another aspect of the present invention is a request processing method for execution requests that is executed by a control system including a first electronic device that processes execution requests from a plurality of devices and a second electronic device that receives execution requests from some of the plurality of devices and transmits the execution requests to the first electronic device. The request processing method includes the steps of: determining, by a second processor of the second electronic device, an order of transmission for transmitting execution requests from some of the plurality of devices to the first electronic device according to a second priority rank that is assigned to each execution request; transmitting, by the second processor, the execution requests to the first electronic device in the determined order of transmission; and determining, by a first processor of the first electronic device, an order of processing of the execution requests from the plurality of devices according to a first priority rank that is assigned to each execution request.

The aspect of the present invention can realize a control system that can quickly coordinate a plurality of received execution requests.

BRIEF DESCRIPTION OF THE DRAWINGS

FIG. 3 is a view showing one example of the configuration of a first coordination table;

FIG. 4 is a view showing one example of the configuration of a second coordination table;

FIG. 5 is a view showing one example of the configuration of an updated second coordination table;

FIG. 7 is a view showing a modified example of the second coordination table.

DETAILED DESCRIPTION OF THE PREFERRED EMBODIMENTS

Figure 1:
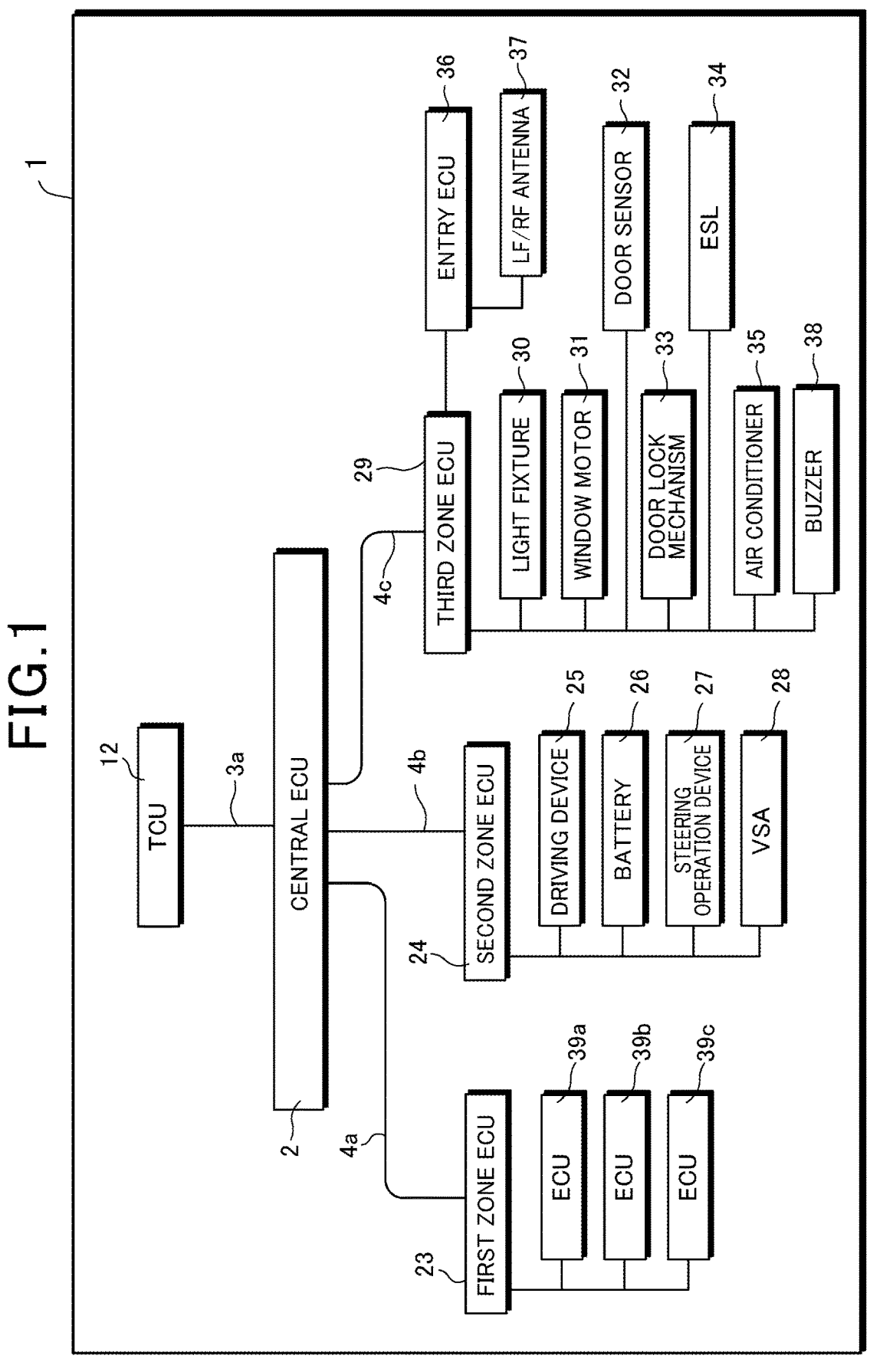
FIG. 1 is a diagram showing the configuration of a control system according to one embodiment of the present invention.

FIG. 1 is a diagram showing a control system 1 of a vehicle.

The control system 1 includes a central ECU 2 that performs overall control and information processing in the vehicle. The central ECU 2 is connected to communication lines including a first communication line 3a and second communication lines 4a, 4b, 4c. The central ECU 2 realizes a gateway function that manages exchange of communication data among these lines. Further, the central ECU 2 executes over-the-air (OTA) management. OTA management includes control relating to a process of downloading update programs for on-board devices included in the vehicle from a server outside the vehicle, and a process of applying the downloaded update programs to the on-board devices.

The first communication line 3a and the second communication lines 4a, 4b, 4c are formed from buses that conduct communication conforming to a standard such as CAN or Ethernet (R), or communication lines that conduct peer-to-peer (P2P) communication. The first communication line 3a may be composed of a plurality of communication lines that conducts communication conforming to the same standard, or may be composed of a plurality of communication lines that conducts communication conforming to different standards. The same applies to the second communication lines 4a, 4b, 4c.

A telematics control unit (TCU) 12 is connected to the first communication line 3a. The TCU 12 is a wireless communication device conforming to a communication standard for a mobile communication system. In addition to the TCU 12, an in-vehicle infotainment (IVI)-ECU, a rear camera, a speaker, a microphone, a meter panel, a steering switch, a vehicle-to-everything (V2X) communication device, a global navigation satellite system (GNSS) sensor, and/or a touch panel may be connected to the first communication line 3a.

A first zone ECU 23 is connected to the second communication line 4a. ECUs 39a, 39b, 39c are connected to the first zone ECU 23. The first zone ECU 23 is, for example, a control device relating to a driver assistance system. The ECUs 39a, 39b, 39c can be, for example, a map positioning unit (MPU), a multi-view camera (MVC)-ECU, a parking support (PKS)-ECU, an advanced driver-assistance system (ADAS)-ECU, etc.

A second zone ECU 24 is connected to the second communication line 4b. The second zone ECU 24 is connected to a driving device 25, a battery 26, a steering operation device 27, and a vehicle stability assist (VSA) device 28. The steering operation device 27 may include a brake, an accelerator, an electric power steering (EPS), etc. The driving device 25 is, for example, a motor or an internal combustion engine that drives the vehicle.

A third zone ECU 29 is connected to the second communication line 4c. The third zone ECU 29 is connected to light fixtures 30 and a window motor 31. The light fixtures 30 includes, for example, headlamps, tail lamps, turn signal lights, etc. The window motor 31 opens and closes a vehicle window. The third zone ECU 29 is connected to a door sensor 32, a door lock mechanism 33, an electronic steering lock (ESL) 34, and an air conditioner 35. The door sensor 32 detects operation on a vehicle door. The door lock mechanism 33 locks and unlocks a door of the vehicle. An entry ECU 36 is connected to the third zone ECU 29. The entry ECU 36 is connected to an LF/RF antenna 37 for performing wireless communication with an electronic key of the host vehicle. The electronic key is an electronic device having a wireless communication function and called a smart key or an FOB key. The electronic key may be a mobile terminal, such as a smartphone. In cooperation with other on-board ECUs, the entry ECU 36 processes a user access from the outside of the vehicle to the control system 1 and realizes the operation of so-called smart entry.

In this embodiment, a buzzer 38 that emits a warning sound to the outside and inside of the vehicle is also connected to the third zone ECU 29.

Here, the third zone ECU 29 shown in FIG. 1 corresponds to the first electronic device in this disclosure, and the central ECU 2 shown in FIG. 1 corresponds to the second electronic device in this disclosure.

The third zone ECU 29 that is the first electronic device processes execution requests from a plurality of devices according to a first priority rank that is assigned to each execution request. The central ECU 2 that is the second electronic device transmits execution requests from some of the plurality of devices to the third zone ECU 29 that is the first electronic device in an order according to a second priority rank that is assigned to each execution request.

In this embodiment, processing of execution requests performed by the third zone ECU 29 is, for example, emission of a warning sound from the buzzer 38 in various forms.

Figure 2:
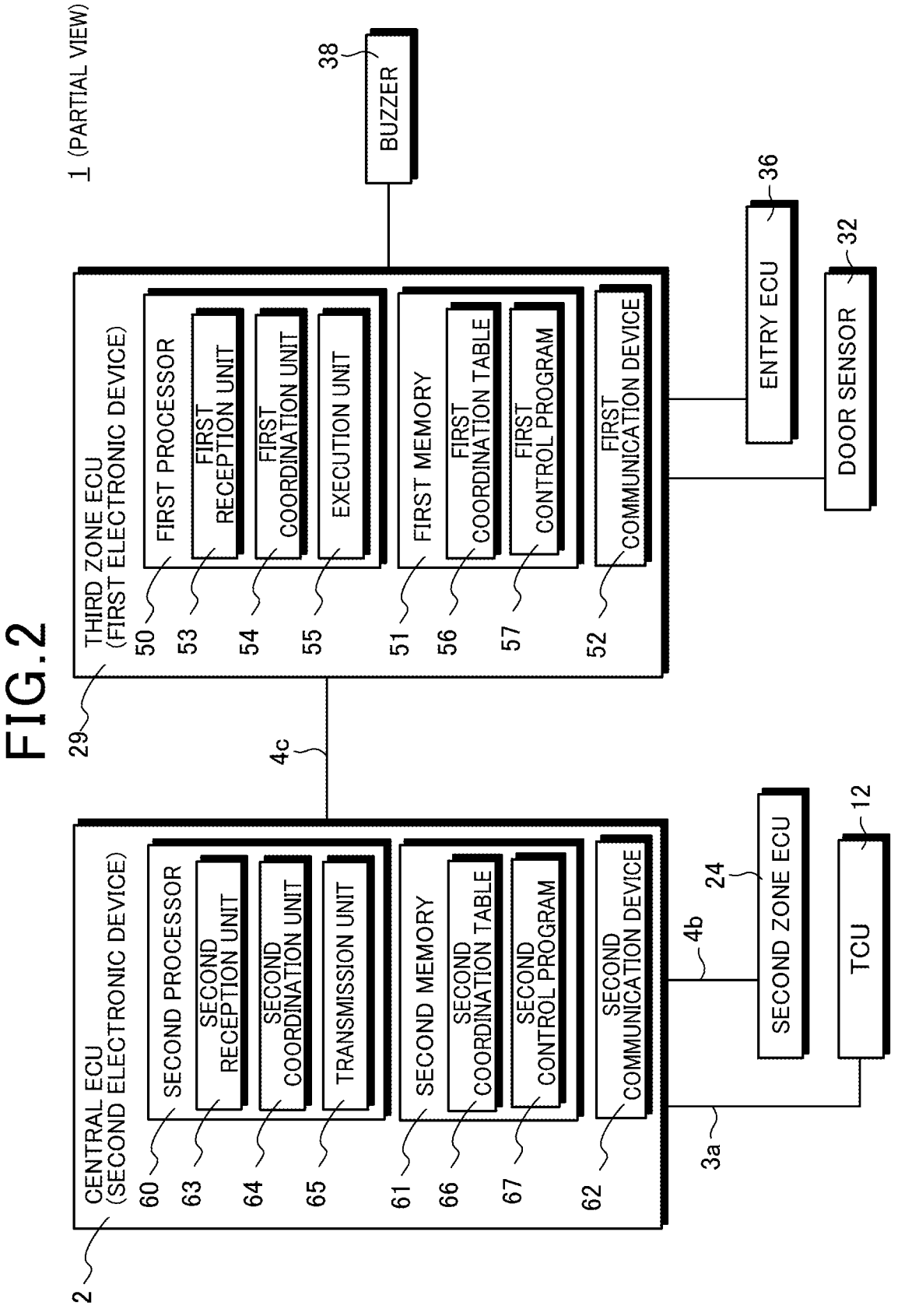
FIG. 2 is a diagram showing one example of the configurations of a third zone ECU that is a first electronic device and a central ECU 2 that is a second electronic device.

FIG. 2 is a diagram showing one example of the configurations of the third zone ECU 29 and the central ECU 2. In FIG. 2, the buzzer 38, the door sensor 32, the entry ECU, the TCU 12, and the second zone ECU 24 that cooperate with the third zone ECU 29 and the central ECU 2 in this embodiment are also shown. The door sensor 32, the entry ECU, the TCU 12, and the second zone ECU 24 correspond to the "plurality of devices" in this disclosure that transmits execution requests to be processed by the first electronic device.

First, the configuration of the third zone ECU 29 that is the first electronic device will be described.

The third zone ECU 29 includes a first processor 50, a first memory 51, and a first communication device 52. The first memory 51 is formed from, for example, a volatile or non-volatile semiconductor memory. The first communication device 52 is a transceiver for communicating with the central ECU 2, the entry ECU 36, and other ECUs.

The first processor 50 is a computer including, for example, a central processing unit (CPU) etc. The first processor 50 may be configured to have a read-only memory (ROM) in which a program is written, a random-access memory (RAM) that temporarily stores data, etc. The first processor 50 includes a first reception unit 53, a first coordination unit 54, and an execution unit 55 as functionals element or functional units.

These functional elements included in the first processor 50 are realized, for example, as the first processor 50 that is a computer executes a first control program 57 stored in the first memory 51. The first control program 57 can be stored in any computer-readable storage medium. Instead of this, all or some of the functional elements included in the first processor 50 may be each formed from hardware including one or more electronic circuit components.

The first reception unit 53 receives operation execution requests relating to the buzzer 38 that are transmitted from the entry ECU 36, the door sensor 32, the second zone ECU 24, and the TCU 12. Here, execution requests from the second zone ECU 24 and the TCU 12 are received through the central ECU 2 that is the second electronic device.

The first coordination unit 54 determines an order of processing of execution requests from a plurality of devices including the door sensor 32, the entry ECU, the TCU 12, and the second zone ECU 24 according to the first priority rank that is assigned to each execution request. In this embodiment, a first coordination table 56 that shows a correspondence relationship between each execution request and the first priority rank is stored in the first memory 51. The first coordination unit 54 determines the order of processing of received execution requests with reference to the first coordination table 56 stored in the first memory 51.

In this embodiment, execution requests received through the central ECU 2 can include a first execution request to which a first priority rank is assigned in the third zone ECU 29 and a second execution request to which a first priority rank is not assigned in the third zone ECU 29. Specifically, the first execution request is an execution request that has the correspondence relationship with the first priority rank shown in the first coordination table 56. The second execution request can be, for example, an execution request that is newly added in the second zone ECU 24 or the TCU 12 connected to the central ECU 2, as an execution request to be transmitted by these devices, due to a design change etc. in the control system 1 after the first coordination table 56 is created or stored.

As will be described later, when a second execution request is received from the second zone ECU 24 or the TCU 12, the central ECU 2 assigns a first priority rank to this second execution request. When transmitting the second execution request to the third zone ECU 29, the central ECU 2 transmits, along with the second execution request, priority rank information that shows the first priority rank assigned to the second execution request.

In this case, the first coordination unit 54 determines an order of processing of received execution requests including a first execution request and a second execution request based on the first coordination table 56 and the priority rank information on the second execution request received from the central ECU 2.

In this embodiment, in particular, in the third zone ECU 29 (more specifically, in the first coordination table 56), first priority ranks are set such that available ranks to which execution requests are not assigned are included, dispersedly in order of rank, among ranks to which execution requests are assigned. As described above, an execution request to which a first priority rank is assigned in the third zone ECU 29 (more specifically, in the first coordination table 56) is referred to as a first execution request.

As will be described later, the first priority rank shown by the priority rank information transmitted from the central ECU 2 along with the second execution request is set to one of the available ranks.

FIG. 3 is a view showing one example of the first coordination table 56. In the first coordination table 56 shown in FIG. 3, the left row shows first priority ranks and the right row shows execution requests. In FIG. 3, the lines are arranged in the order of the first priority rank from bottom to top, and blank lines for the execution request show that first priority ranks for these lines are available ranks. In FIG. 3, REQ1001, REQ1002, etc. that are execution requests to which first priority ranks are assigned are first execution requests.

In the example shown in FIG. 3, other than the ranks "1," "2," . . . , "5" to which the execution requests REQ1001, REQ1002, etc. are assigned, three available ranks "High," "Middle," and "Low" to which execution requests are not assigned are set dispersedly in the order of the first priority rank (specifically, as the top rank, the bottom rank, and the fourth rank from the top).

Here, in this embodiment, REQ1001, REQ1002, etc. that are execution requests to which first priority ranks are assigned in the first coordination table 56 shown in FIG. 3 are execution requests that are transmitted from one of the entry ECU 36, the door sensor 32, the second zone ECU 24, and the TCU 12.

As will be described later, execution requests transmitted from the central ECU 2 can also include a first execution request to which a first priority rank is already assigned in the first coordination table 56. When the central ECU 2 transmits a first execution request, it does not transmit priority rank information. When received execution requests are all first execution requests, the first coordination unit 54 determines the order of processing of these execution requests according to only the first priority ranks shown by the first coordination table 56.

Referring to FIG. 2, the execution unit 55 processes execution requests according to the order of processing determined by the first coordination unit 54. In this embodiment, execution requests include request processing information that shows the contents of processing, for example, the tone, the number of times, and the volume of a sound to be emitted by the buzzer 38. The execution unit 55 processes each execution request based on the request processing information included in the execution request.

Next, the configuration of the central ECU 2 that is the second electronic device will be described.

The central ECU 2 includes a second processor 60, a second memory 61, and a second communication device 62. The second memory 61 is formed from, for example, a volatile or non-volatile semiconductor memory. The second communication device 62 is a transceiver for communicating with the third zone ECU 29, the second zone ECU 24, the TCU 12, and other ECUs.

The second processor 60 is a computer including, for example, a CPU etc. The second processor 60 may be configured to have an ROM in which a program is written, an RAM that temporarily stores data, etc. The second processor 60 includes a second reception unit 63, a second coordination unit 64, and a transmission unit 65 as functional elements or functional units.

These functional elements included in the second processor 60 are realized, for example, as the second processor 60 that is a computer executes a second control program 67 stored in the second memory 61. The second control program 67 can be stored in any computer-readable storage medium. Instead of this, all or some of the functional elements included in the second processor 60 may be each formed from hardware including one or more electronic circuit components.

For example, the second reception unit 63 receives operation execution requests relating to the buzzer 38 that are transmitted from the second zone ECU 24 and the TCU 12 that are the aforementioned "some of the plurality of devices" in this disclosure. As described above, these execution requests can include a first execution request to which a first priority rank is assigned in the first coordination table 56 of the third zone ECU 29 and a second execution request to which a first priority rank is not assigned in the first coordination table 56.

The second coordination unit 64 determines an order of transmission for transmitting execution requests received by the second reception unit 63 to the third zone ECU 29 according to the second priority rank that is assigned to each execution request. In this embodiment, a second coordination table 66 that shows a correspondence relationship between each execution request and the second priority rank is stored in the second memory 61. When determining the order of transmission, the second coordination unit 64 identifies the second priority rank of a received execution request with reference to the second coordination table 66.

The transmission unit 65 transmits the received execution requests to the third zone ECU 29 in the order of transmission determined by the second coordination unit 64.

In this configuration, when the second reception unit 63 receives a second execution request, the second coordination unit 64 assigns one of the available ranks in the first coordination table 56 of the third zone ECU 29 as a first priority rank to the received second execution request. The second coordination unit 64 generates priority rank information that shows the assigned first priority rank. The transmission unit 65 transmits this priority rank information along with the second execution request to the third zone ECU 29.

In this embodiment, the second coordination table 66 shows the available ranks to be assigned to second execution requests in addition to the correspondence relationships between the respective execution requests and the second priority ranks. Based on the second coordination table 66, the second coordination unit 64 assigns a first priority rank that is the available rank to the second execution request and determines the order of transmission of execution requests to be transmitted to the third zone ECU 29.

FIG. 4 is a view showing one example of the second coordination table 66. In the second coordination table 66 shown in FIG. 4, the left row shows second priority ranks and the middle row shows execution requests. The right row of the second coordination table 66 shows first priority ranks to be assigned to the execution requests in the middle row when these execution requests are second execution requests. The lines in FIG. 4 are arranged in the order of the second priority rank from top to bottom.

In the second coordination table 66 shown in FIG. 4, the three execution requests shown in the middle row, REQ1001, REQ1002, and REQ1003, are all first execution requests to which first priority ranks are assigned in the first coordination table 56 of the third zone ECU 29 shown in FIG. 3, and therefore the row "first priority rank" that is the right row of the second coordination table 66 is left blank.

FIG. 5 is a view showing one example of an updated second coordination table 66. In the updated second coordination table 66 shown in FIG. 5, execution requests REQ2001, REQ2002, and REQ2003 are newly added. Such updating of the second coordination table 66 can be performed, for example, when a type of execution request to be received by the central ECU 2 is added due to a design change etc. of the second zone ECU 24 or the TCU 12.

In the updated second coordination table 66 shown in FIG. 5, "High," "Middle," and "Low" that are the available ranks indicated in the first coordination table 56 shown in FIG. 3 are indicated in the lines of the row "first priority rank" corresponding to REQ2001, REQ2002, and REQ2003 that are second execution requests which are newly added and to which first priority ranks are not yet assigned in the third zone ECU 29, as first priority ranks to be respectively assigned to these second execution requests.

In this case, for example, when the second reception unit 63 receives the execution request REQ2001, the second coordination unit 64 determines the order of transmission of execution requests received at that time according to the second priority ranks indicated by the updated second coordination table 66 shown in FIG. 5. In this case, the second coordination unit 64 assigns the first priority rank "High" indicated in the row "first priority rank" to the received second execution request REQ2001 according to the updated second coordination table 66 of FIG. 5. The transmission unit 65 transmits the execution request REQ2001 along with priority rank information showing the assigned first priority rank "High" to the third zone ECU 29.

As described above, the first coordination unit 54 of the third zone ECU 29 having received the execution request REQ2001 thus transmitted determines the order of processing of all execution requests (including REQ2001) received at that time according to the first priority rank based on the first coordination table 56 and the priority rank information received along with the execution request REQ2001. Thus, in the execution unit 55, the execution requests received at that time including the second execution request REQ2001 are processed in the order of processing according to the first priority rank.

In the control system 1 having this configuration, some of execution requests to be processed in the third zone ECU 29 that is the first electronic device are received in the central ECU 2 that is the second electronic device and then transmitted to the third zone ECU 29 in the order of transmission according to the second coordination table 66. Thus, the third zone ECU 29 receives the execution requests from the central ECU 2 in descending order of priority rank, and therefore can quickly perform determination of the order of execution of the execution requests, i.e., coordination for the order of execution of the execution requests.

In the third zone ECU 29, the first priority ranks are set such that available ranks to which execution requests are not assigned are included, dispersedly in order of rank (in rank order), among ranks to which execution requests are assigned. In the control system 1, therefore, when a type of execution request to be mediated by the central ECU 2 that is the second electronic device is added due to a design change etc., the available rank can be assigned as the first priority rank to this newly added execution request (i.e., a second execution request). Thus, in the control system 1, even when the types of execution requests are increased or a type of execution request is added, the design change can be responded to by simply updating only the second coordination table 66 in the central ECU 2, without updating the first coordination table 56 of the third zone ECU 29.

Available ranks set as first priority ranks in the third zone ECU 29 need not necessarily be set in the form shown in FIG. 3, as long as they are dispersedly provided in the order of the first priority rank. For example, the first priority ranks set in the first coordination table of the third zone ECU 29 can be such that a plurality of groups of ranks into which execution requests are divided according to the first priority rank each includes at least one available rank to which an execution request is not assigned.

Figure 6:
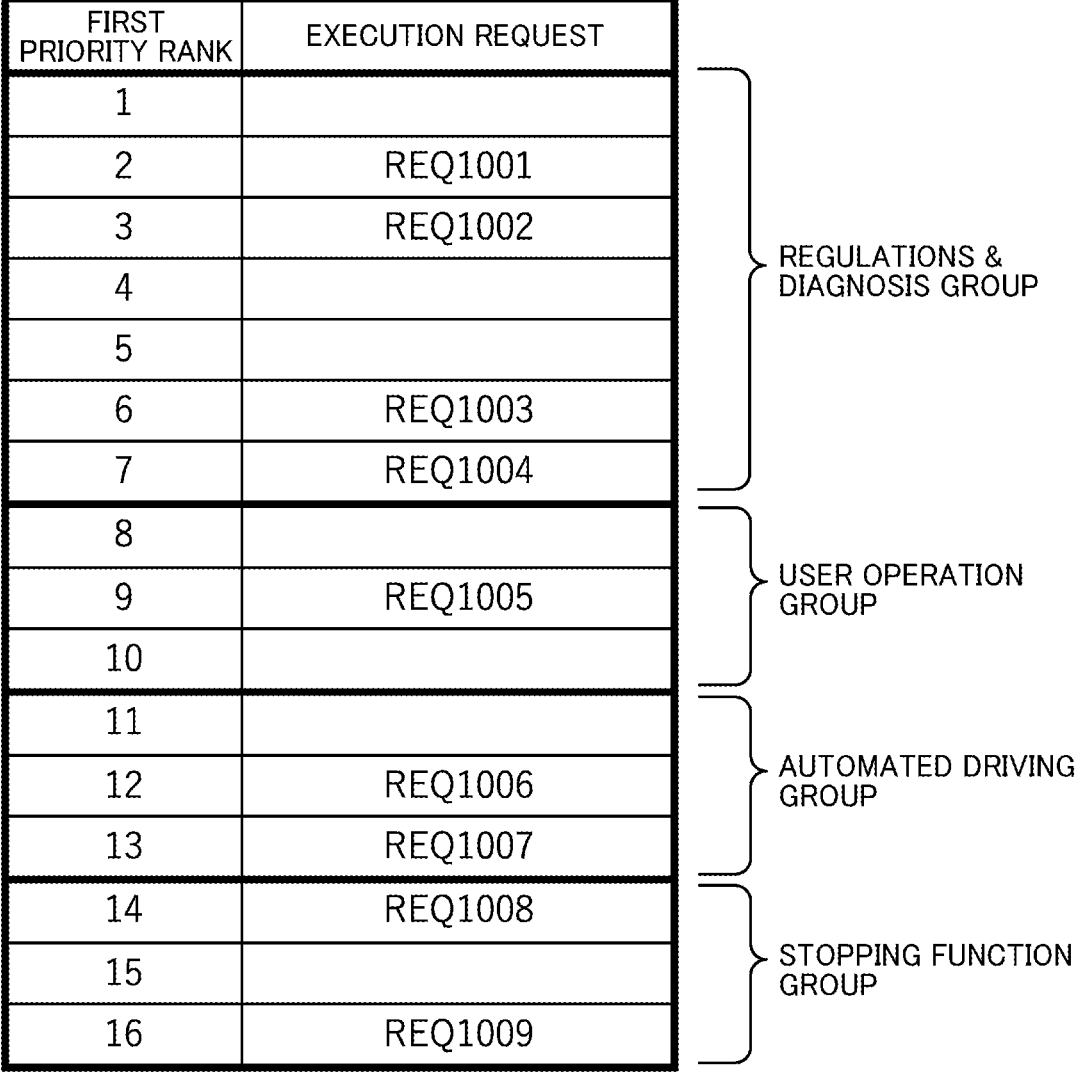
FIG. 6 is a view showing a modified example of the first coordination table.

FIG. 6 is a view showing one example of the configuration of a first coordination table 56-1 that is a modified example of the first coordination table 56 and shows such first priority ranks including available ranks for each group. The first coordination table 56-1 shown in FIG. 6 can be used in place of the first coordination table 56 in FIG. 2.

In the first coordination table 56-1 shown in FIG. 6, the first priority ranks are divided, with ranks "1" to "7" in a first group of ranks, ranks "8" to "10" in a second group of ranks, ranks "11" to "13" in a third group of ranks, and ranks "14" and "15" in a fourth group of ranks. In each group of ranks, one or more available ranks are included dispersedly in order of rank within the group of ranks.

In the example shown in FIG. 6, each group of ranks is set so as to correspond to a group of execution requests that have the same predetermined attribute. For example, the first group of ranks corresponds to a group of execution requests relating to compliance with regulations and diagnostic functions, and the second group of ranks corresponds to a group of execution requests that occur in relation to user operation. The third group of ranks and the fourth group of ranks correspond to groups of execution requests that occur in relation to automated driving functions and stopping functions, respectively.

FIG. 7 is a view showing one example of the configuration of a second coordination table 66-1 that is a modified example of the second coordination table 66 and that can be used in the central ECU 2 as a table corresponding to the first coordination table 56-1 shown in FIG. 6. The second coordination table 66-1 has the same configuration as the second coordination table 66. However, instead of "High," "Middle," and "Low," available ranks "1," "8," and "15" set in the first coordination table 56-1 shown in FIG. 6 are shown as first priority ranks to be assigned to the added execution requests REQ2001, REQ2002, and REQ2003.

Figure 8:
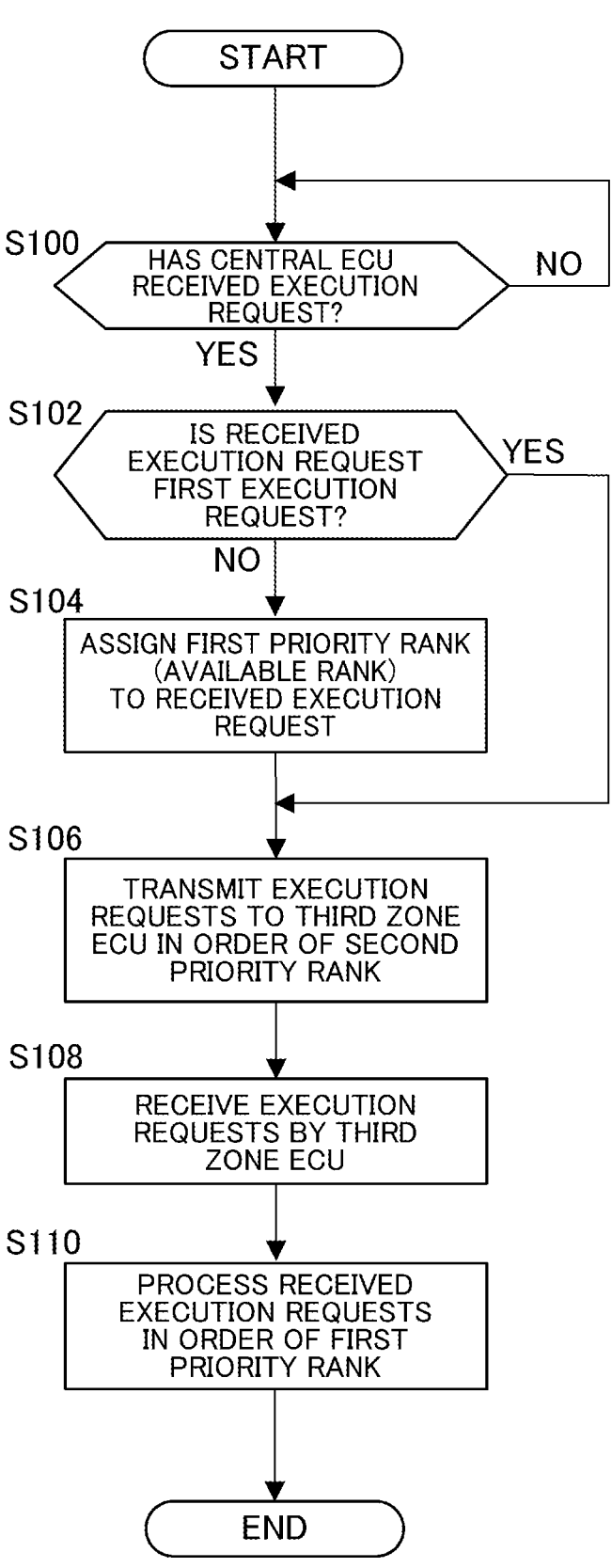
FIG. 8 is a flowchart showing an operation procedure of the control system.

Next, the procedure of processing of execution requests in the central ECU 2 and the third zone ECU 29 of the control system 1 will be described. FIG. 8 is a flowchart showing particularly a procedure until execution requests received in the central ECU 2 are processed in the third zone ECU 29. The process of FIG. 8 is repeatedly executed. As described above, the third zone ECU 29 and the central ECU 2 correspond to the first electronic device and the second electronic device, respectively, in this disclosure.

When the process is started, first, the second reception unit 63 of the central ECU 2 determines whether an execution request has been received from other on-board devices, such as the TCU 12 or the second zone ECU 24 (S100). When an execution request has not been received (S100: NO), the second reception unit 63 returns to step S100 and repeats the process, waiting to receive an execution request.

On the other hand, when an execution request has been received in step S100 (S100: YES), the second coordination unit 64 of the central ECU 2 determines whether the received execution request is a first execution request to which a first priority rank is assigned in the third zone ECU 29 (S102). When the received execution request is a second execution request to which a first priority rank is not assigned in the third zone ECU 29 (S102: NO), the second coordination unit 64 assigns a first priority rank to this received second execution request (S104). As described above, the first priority rank assigned here is one of the available ranks in the first coordination table 56 of the third zone ECU 29. The second coordination unit 64 generates priority rank information showing the assigned first priority rank.

Next, the second coordination unit 64 determines the order of transmission of received execution requests according to the second priority rank, and the transmission unit 65 transmits these execution requests to the third zone ECU 29 in the determined order of transmission (S106). In this case, for execution requests to which first priority ranks have been assigned by the second coordination unit 64, the transmission unit 65 transmits the priority rank information along with these execution requests to the third zone ECU 29.

On the other hand, when the execution request received by the second reception unit 63 is a first execution request in step S102 (S102: YES), the second coordination unit 64 moves to the processing of step S106.

Next, the first reception unit 53 of the third zone ECU 29 receives the execution requests that the transmission unit 65 of the central ECU 2 has transmitted (S108). The first coordination unit 54 of the third zone ECU 29 determines the order of processing of the received execution requests according to the first priority rank, and the execution unit 55 processes the received execution requests in the determined order of processing (S110), and ends the operation.

In the above embodiment, the third zone ECU 29 performs acoustic emission from the buzzer 38 as processing based on an execution request. As other embodiments, the third zone ECU 29 may control the operation of any device or equipment other than the buzzer 38 based on an execution request. For example, the third zone ECU 29 may control, based on execution requests, the operation of one or more of any devices and pieces of equipment such as a horn (not shown), the light fixtures 30 including headlights, brake lights, hazard lights, and interior lights, wipers (not shown), and the door lock mechanism 33. As described above, an execution request can include request processing information that shows the contents of processing to be performed by the third zone ECU 29 (i.e., the contents of a specific operation for which commands are to be given to these devices or pieces of equipment).

Further, as other embodiment, when an execution request is received from the central ECU 2, the execution unit 55 of the third zone ECU 29 may transmit, to the central ECU 2, execution information that is information about a status of execution of processing relating to the received execution request. Thus, for example, when processing of an execution request relating to user operation is delayed in the third zone ECU 29, the central ECU 2 can make a notification such as "Control is delayed due to overlapping control signals." to the user based on the execution information through an on-board speaker (not shown), which can increase the convenience of the control system 1.

The first electronic device in this disclosure has been described as being the third zone ECU 29 in the above embodiment, but the first electronic device can also be any electronic device different from the second electronic device. For example, the present invention may be applied with the second zone ECU 24 serving as the first electronic device.

The present invention is not limited to the configuration of the above embodiment but can be implemented in various forms within the scope of the gist of the invention.

The embodiment and its modified examples having been described above support the following configurations:

(Configuration 1) A control system including a first electronic device that processes execution requests from a plurality of devices and a second electronic device that receives execution requests from some of the plurality of devices and transmits the execution requests to the first electronic device, wherein: the first electronic device includes a first coordination unit that determines an order of processing of execution requests from the plurality of devices according to a first priority rank that is assigned to each execution request; and the second electronic device includes a second coordination unit that determines an order of transmission for transmitting execution requests from some of the plurality of devices to the first electronic device according to a second priority rank that is assigned to each execution request, and a transmission unit that transmits the execution requests to the first electronic device in the order of transmission determined by the second coordination unit.

According to the control system of Configuration 1, the first electronic device receives execution requests in descending order of priority rank from the second electronic device, and therefore can quickly perform determination of the order of execution of the execution requests, i.e., coordination for the order of execution of the execution requests.

(Configuration 2) The control system according to Configuration 1, wherein, in the first electronic device, the first priority ranks are set such that available ranks to which execution requests are not assigned are included, dispersedly in order of rank, among ranks to which execution requests are assigned.

According to the control system of Configuration 2, when the types of execution requests are increased or a type of execution request is added due to a design change, for example, a first priority rank that is an available rank can be assigned to the execution request corresponding to the increase or the addition, which can make it easy to respond to the design change.

(Configuration 3) The control system according to Configuration 2, wherein: the execution requests include a first execution request to which the first priority rank is assigned in the first electronic device and a second execution request to which the first priority rank is not assigned in the first electronic device; when the second execution request is received, the second coordination unit of the second electronic device assigns one of the available ranks to the second execution request as the first priority rank; and the transmission unit of the second electronic device transmits to the first electronic device, along with the second execution request, priority rank information that shows the first priority rank assigned to the second execution request by the second coordination unit.

According to the control system of Configuration 3, the second electronic device assigns a first priority rank to an execution request that has been added due to a design change, for example, by means of an available rank among first priority ranks, which can make it easy to respond to the design change.

(Configuration 4) The control system according to Configuration 3, wherein: the first electronic device stores a first coordination table that shows a correspondence relationship between each of the first execution requests and the first priority rank; and the first coordination unit of the first electronic device determines an order of processing of the received execution requests including the first execution request and the second execution request based on the first coordination table and the priority rank information on the second execution request received from the second electronic device.

According to the control system of Configuration 4, even when the types of execution requests are increased or a type of execution request is added due to a design change, for example, the design change can be easily responded to without the need to change the first coordination table.

(Configuration 5) The control system according to Configuration 3 or 4, wherein: the second electronic device stores a second coordination table that shows a correspondence relationship between each of the execution requests and the second priority rank and the available ranks to be assigned to the second execution requests; and based on the second coordination table, the second coordination unit of the second electronic device assigns the first priority rank that is the available rank to the second execution request and determines the order of transmission of the execution requests to the first electronic device.

According to the control system of Configuration 5, when the types of execution requests are increased or a type of execution request is added due to a design change, for example, only the second coordination table need be changed or updated while the first coordination table need not be changed, which can make it easy to respond to the design change.

(Configuration 6) The control system according to any one of Configurations 1 to 5, wherein: the first electronic device includes an execution unit that processes the execution requests in an order determined by the first coordination unit; and when the execution request is received from the second electronic device, the execution unit transmits execution information that is information about a status of execution of the received execution request to the second electronic device.

According to the control system of Configuration 6, for example, the second electronic device can learn from execution information that processing of an execution request is delayed in the first electronic device and make a notification to the user, which can increase user's convenience.

(Configuration 7) The control system according to any one of Configurations 1 to 6, wherein the execution request includes request processing information that shows a content of processing to be performed by the first electronic device.

According to the control system of Configuration 7, the contents of an operation requested by each execution request can be easily corrected.

(Configuration 8) A request processing method for execution requests that is executed by a control system including a first electronic device that processes execution requests from a plurality of devices and a second electronic device that receives execution requests from some of the plurality of devices and transmits the execution requests to the first electronic device, the request processing method including the steps of: determining, by a second processor of the second electronic device, an order of transmission for transmitting execution requests from some of the plurality of devices to the first electronic device according to a second priority rank that is assigned to each execution request; transmitting, by the second processor, the execution requests to the first electronic device in the determined order of transmission; and determining, by a first processor of the first electronic device, an order of processing of the execution requests from the plurality of devices according to a first priority rank that is assigned to each execution request.

According to the request processing method of Configuration 8, the first electronic device receives execution requests in descending order of priority rank from the second electronic device, and therefore can quickly perform determination of the order of execution of the execution requests, i.e., coordination for the order of execution of the execution requests.

REFERENCE SIGNS LIST

1 Control system
2 Central ECU
3a, 3b First communication line
4a, 4b, 4c Second communication line
12 TCU
23 First zone ECU
24 Second zone ECU
25 Driving device
26 Battery
27 Steering operation device
28 VSA device
29 Third zone ECU
30 Light fixture
31 Window motor
32 Door sensor
33 Door lock mechanism
34 ESL
35 Air conditioner
36 Entry ECU
37 LF/RF antenna
38 Buzzer
39a, 39b, 39c ECU
50 First processor
51 First memory
52 First communication device
53 First reception unit
54 First coordination unit
55 Execution unit
56, 56-1 First coordination table
57 First control program
60 Second processor
61 Second memory
62 Second communication device
63 Second reception unit
64 Second coordination unit
65 Transmission unit
66, 66-1 Second coordination table
67 Second control program
What is claimed is:

1. A control system comprising a first electronic device that processes execution requests from a plurality of devices and a second electronic device that receives execution requests from some of the plurality of devices and transmits the execution requests to the first electronic device, wherein:
the first electronic device includes a first processor that includes:
a first coordination unit that determines an order of processing of execution requests from the plurality of devices according to a first priority rank that is assigned to each execution request; and
an execution unit that processes the execution requests in the order of processing determined by the first coordination unit, and
the second electronic device includes a second processor that includes:
a second coordination unit that determines an order of transmission for transmitting execution requests from some of the plurality of devices to the first electronic device according to a second priority rank that is assigned to each execution request; and
a transmission unit that transmits the execution requests to the first electronic device in the order of transmission determined by the second coordination unit,
when the execution request is received from the second electronic device, the execution unit transmits execution information that is information about a status of execution of the received execution request to the second electronic device.

2. The control system according to claim 1, wherein, in the first electronic device, the first priority ranks are set such that available ranks to which execution requests are not assigned are included, dispersedly in order of rank, among ranks to which execution requests are assigned.

3. The control system according to claim 2, wherein:
the execution requests include a first execution request to which the first priority rank is assigned in the first electronic device and a second execution request to which the first priority rank is not assigned in the first electronic device;
when the second execution request is received, the second coordination unit of the second electronic device assigns one of the available ranks to the second execution request as the first priority rank; and
the transmission unit of the second electronic device transmits to the first electronic device, along with the second execution request, priority rank information that shows the first priority rank assigned to the second execution request by the second coordination unit.

4. The control system according to claim 3, wherein:
the first electronic device stores a first coordination table that shows a correspondence relationship between each of the first execution requests and the first priority rank; and
the first coordination unit of the first electronic device determines an order of processing of the received execution requests including the first execution request and the second execution request based on the first coordination table and the priority rank information on the second execution request received from the second electronic device.

5. The control system according to claim 3, wherein:
the second electronic device stores a second coordination table that shows a correspondence relationship between each of the execution requests and the second priority rank and the available ranks to be assigned to the second execution requests; and
based on the second coordination table, the second coordination unit of the second electronic device assigns the first priority rank that is the available rank to the second execution request and determines the order of transmission of the execution requests to the first electronic device.

6. The control system according to claim 1, wherein the execution request includes request processing information that shows a content of processing to be performed by the first electronic device.

7. A request processing method for execution requests that is executed by a control system including a first electronic device that processes execution requests from a plurality of devices and a second electronic device that receives execution requests from some of the plurality of devices and transmits the execution requests to the first electronic device, the request processing method comprising the steps of:

determining, by a second processor of the second electronic device, an order of transmission for transmitting execution requests from some of the plurality of devices to the first electronic device according to a second priority rank that is assigned to each execution request;

transmitting, by the second processor, the execution requests to the first electronic device in the determined order of transmission;

determining, by a first processor of the first electronic device, an order of processing of the execution requests from the plurality of devices according to a first priority rank that is assigned to each execution request; and processing, by the first processor, the execution requests in the order of processing determined, wherein when the execution request is received from the second electronic device, the first processor transmits execution information that is information about a status of execution of the received execution request to the second electronic device.

8. A control system comprising a first electronic device that processes execution requests from a plurality of devices and a second electronic device that receives execution requests from some of the plurality of devices and transmits the execution requests to the first electronic device, wherein:

the first electronic device includes a first processor that includes:

a first coordination unit that determines an order of processing of execution requests from the plurality of devices according to a first priority rank that is assigned to each execution request; and an execution unit that processes the execution requests, and the second electronic device includes a second processor that includes:

a second coordination unit that determines an order of transmission for transmitting execution requests from some of the plurality of devices to the first electronic device according to a second priority rank that is assigned to each execution request; and a transmission unit that transmits the execution requests to the first electronic device in the order of transmission determined by the second coordination unit, the execution unit processes the execution requests in the order of processing which is determined by the first coordination unit according to the first priority rank and which is of the execution requests including the execution requests received from the second electronic device.

* * * * *